(12) United States Patent
Kuchuk et al.

(10) Patent No.: US 11,149,545 B2
(45) Date of Patent: Oct. 19, 2021

(54) CLOSED CHAMBER IMPULSE TEST WITH DOWNHOLE FLOW RATE MEASUREMENT

(71) Applicant: SCHLUMBERGER TECHNOLOGY CORPORATION, Sugar Land, TX (US)

(72) Inventors: Fikri John Kuchuk, Meudon (FR); Stephane Hiron, Igny (FR); Bertrand Theuveny, Moscow (RU); Anthony J. Fitzpatrick, Le Vesinet (FR); James G. Filas, Missouri City, TX (US); Alexander Starostin, Abingdon (GB); Pavel Evgenievich Spesivtsev, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/889,267

(22) PCT Filed: May 6, 2014

(86) PCT No.: PCT/US2014/037023
§ 371 (c)(1),
(2) Date: Nov. 5, 2015

(87) PCT Pub. No.: WO2014/182739
PCT Pub. Date: Nov. 13, 2014

(65) Prior Publication Data
US 2016/0102548 A1    Apr. 14, 2016

Related U.S. Application Data

(60) Provisional application No. 61/820,462, filed on May 7, 2013.

(51) Int. Cl.
*E21B 49/08* (2006.01)
*E21B 49/00* (2006.01)
*G01F 1/34* (2006.01)

(52) U.S. Cl.
CPC .......... *E21B 49/081* (2013.01); *E21B 49/008* (2013.01); *E21B 49/087* (2013.01); *G01F 1/34* (2013.01)

(58) Field of Classification Search
CPC .... E21B 49/081; E21B 49/088; E21B 49/008; E21B 49/087; E21B 49/00; E21B 49/08; G01V 1/40; G01F 1/34
(Continued)

(56) References Cited

U.S. PATENT DOCUMENTS 5,887,652 A * 3/1999 Beck .................... E21B 49/081
166/264
6,330,913 B1 * 12/2001 Langseth .............. E21B 49/088
166/250.01
(Continued)

FOREIGN PATENT DOCUMENTS

WO        WO0065200 A1    11/2000

OTHER PUBLICATIONS

Biryukov et al., "Pressure transient solutions to mixed boundary value problems for partially open wellbore geometries in porous media", Journal of Petroleum Science and Engineering, 96-97:162-175, 2012.
(Continued)

*Primary Examiner* — Nimeshkumar D Patel
*Assistant Examiner* — Gedeon M Kidanu
(74) *Attorney, Agent, or Firm* — Cameron R. Sneddon

(57) ABSTRACT

An apparatus for performing a well test operation includes a tubular member having a surge chamber and a valve that can control fluid flow from a well into the surge chamber
(Continued)

during the well test operation. The apparatus can also include a flow control device, in addition to the valve, for further controlling fluid flow into the surge chamber from the well. Flow rate and pressure data can be measured during the well test operation and used to estimate reservoir properties. Various other systems, devices, and methods are also disclosed.

20 Claims, 4 Drawing Sheets

(58) Field of Classification Search
USPC .............. 73/152.01, 152.22, 152.24, 152.27, 73/152.54, 152.55
See application file for complete search history.

(56) References Cited

U.S. PATENT DOCUMENTS

| | | | | |
|---|---|---|---|---|
| 6,357,525 | B1* | 3/2002 | Langseth | E21B 49/081 166/147 |
| 6,598,682 | B2 | 7/2003 | Johnson et al. | |
| 7,478,555 | B2* | 1/2009 | Zhan | E21B 49/088 73/152.55 |
| 2002/0017386 | A1* | 2/2002 | Ringgenberg | E21B 21/002 166/250.17 |
| 2005/0103490 | A1* | 5/2005 | Pauley | E21B 43/006 166/245 |
| 2007/0050145 | A1* | 3/2007 | Zhan | E21B 49/081 702/6 |
| 2007/0162235 | A1* | 7/2007 | Zhan | G01V 1/40 702/6 |
| 2008/0149349 | A1 | 6/2008 | Hiron et al. | |
| 2010/0126717 | A1 | 5/2010 | Kuchuk et al. | |
| 2011/0040536 | A1* | 2/2011 | Levitan | G06F 30/20 703/2 |
| 2011/0130966 | A1* | 6/2011 | Zhan | E21B 49/087 702/12 |

OTHER PUBLICATIONS

Biryukov et al., "Transient Pressure Behavior of Reservoirs with Discrete Conductive Faults and Fractures", Transport in Porous Media, 95:239-268, 2012.
Booth et al., "Grid-Based Inversion of Pressure Transient Test Data", Presented at ECMORXII—12th European Conference on the Mathematics of Oil Recovery, Oxford, UK, Sep. 6-9, 2010.
Booth et al., "Grid-based Inversion of Pressure Transient Test Data With Stochastic Gradient Techniques", International Journal for Uncertainty Quantification, 2 (4):323-339, 2012.
Cipolla et al., "Seismic-to-Simulation for Unconventional Reservoir Development", SPE 146876 presented at the SPE Reservoir Characterisation and Simulation Conference and Exhibition, Abu Dhabi, UAE, Oct. 9-11, 2011.
De Brito Nogueira et al., "Integrated Workflow Characterizes Campos Basin Fractured Reservoirs Using Pressure Transient Tests", World Oil, Feb. 2013, pp. 103-106.
Guichard et al., "The First Successful Impulse Test on Coiled Tubing Results in Reliable Reservoir Evaluation for Non-naturally Flowing Wells", SPE 128429 presented at the SPE North Africa Technical Conference and Exhibition, Cairo, EG, Feb. 14-17, 2010.
Kuchuk et al., "Transient Pressure Test Interpretation for Continuously and Discretely Fractured Reservoirs", SPE 158096 presented at the SPE Annual Technical Conference and Exhibition, San Antonio, TX, USA, Oct. 8-10, 2012.
Morton et al., "Global Sensitivity Analysis for Natural Fracture Geological Modeling Parameters from Pressure Transient Tests", SPE 164894 presented at the EAGE Annual Conference & Exhibition incorporating SPE Europec, London, UK, Jun. 10-13, 2013.
Morton et al., "Grid-Based Inversion Methods for Spatial Feature Identification and Parameter Estimation from Pressure Transient Tests", SPE 142996 presented at the SPE EUROPEC/EAGE Annual Conference and Exhibition, Vienna, AT, May 23-26, 2011.
Morton et al., "Integrated Interpretation for Pressure Transient Tests in Discretely Fractured Reservoirs", SPE 154531 presented at the EAGE Annual Conference & Exhibition incorporating SPE Europec, Copenhagen, DK, Jun. 4-7, 2012.
International Search Report and Written Opinion issued in corresponding International Application No. PCT/US2014/037023 dated Nov. 24, 2014.
International Preliminary Report on Patentability issued in the related PCT Application PCT/US2014/037023, dated Nov. 10, 2015 (6 pages).
Extended Search Report issued in the related EP Application 14794319.5, dated Dec. 6, 2016 (8 pages).

* cited by examiner

CLOSED CHAMBER IMPULSE TEST WITH DOWNHOLE FLOW RATE MEASUREMENT

BACKGROUND

This disclosure relates to well testing and more particularly to methods and apparatuses for performing and interpreting well test measurements.

DESCRIPTION OF THE RELATED ART

Hydrocarbon fluids such as oil and natural gas are obtained from a subterranean geologic formation, referred to as a reservoir, by drilling a well that penetrates the hydrocarbon-bearing formation. Once a wellbore is drilled, the well may be tested for purposes of determining the reservoir productivity and other properties of the subterranean formation to assist in decision making for field development.

The testing of the well provides such information as the formation pressure and its gradient; the average formation permeability and/or mobility; the average reservoir productivity; the permeability/mobility and reservoir productivity values at specific locations in the formation; the formation damage assessment near the wellbore; the existence or absence of a reservoir boundary; and the flow geometry and shape of the reservoir. Additionally, the testing may be used to collect representative fluid samples at one or more locations.

Various testing tools may be used to obtain the information listed above. One such tool is a wireline tester, a tool that withdraws a small amount of the formation fluid and may be desirable in view of environmental or tool constraints. The wireline tester, however, produces results in a relatively shallow investigation radius; and the small quantity of the produced fluid sometimes is not enough to clean up the mud filtrate near the wellbore, leading to unrepresentative samples being captured in the test.

Due to the limited capability of the wireline tester, testing may be performed using a drill string that receives well fluid. As compared to the wireline tester, the drill string allows a larger quantity of formation fluid to be produced in the test, which, in turn, leads to larger investigation radius, a better quality fluid sample and a more robust permeability estimate. In general, tests that use a drill string may be divided into two categories: 1) Tests that produce and flow formation fluid to the surface ("drill stem tests" or DSTs); and 2) Tests that produce formation fluid and flow the formation fluid into an inner chamber of the drill string (sometimes referred to as "closed chamber tests" (CCTs) or "surge tests").

For a conventional DST, production from the formation may continue as long as desired since the hydrocarbon that is being produced to the surface may be flared via a dedicated processing system. The production of this volume of fluid ensures that a clean hydrocarbon is acquired at the surface and allows for a relatively large radius of investigation. While providing relatively reliable results, the DST, however, may have the undesirable characteristic of using extensive surface equipment to handle the produced hydrocarbons, which, in many situations, poses an environmental handling hazard and involves additional safety precautions.

In contrast to the DST, the CCT is more environmentally friendly and does not require expensive surface equipment because the well fluid is communicated into an inner chamber (sometimes referred to as a "surge chamber") of the drill string instead of being communicated to the surface of the well. However, due to the downhole confinement of the fluid that is produced in a CCT, a relatively smaller quantity of fluid is produced in a CCT than in a DST. Therefore, the small produced fluid volume in a CCT may lead to less satisfactory wellbore cleanup. Additionally, the mixture of completion, cushion, and formation fluids inside the wellbore and the surge chamber may deteriorate the quality of any collected fluid samples. Furthermore, in the initial part of the CCT, a high speed flow of formation fluid (called a "surge flow") enters the surge chamber. The pressure signal (obtained via a chamber-disposed pressure sensor) that is generated by the surge flow may be quite noisy, thereby affecting the accuracy of the formation parameters that are estimated from the pressure signal.

For reservoirs with weak pressure, the upper end of the surge chamber may be open to production facilities or temporary processing systems during the test. This type of test is called a "slug test". When the wellbore liquid column, or the "slug", reaches the surface, the slug test terminates and a conventional DST starts. A slug test has the similar characteristics of a surge flow as a CCT, so it shares the similar issues in its data interpretation. Many other operations, such as under-balanced perforating using a wireline conveyed gun, may also lead to similar issues when analyzing the measured data. The primary feature of these tests is the variation of skin effect factor due to continuously increasing damage from incompatible fluid injection or continuously decreasing of skin factor from clean-up. The variation of skin effect factor may be compounded with variable flow rate, making the problem more challenging.

The data that is obtained from a CCT, slug test, or other tests with surge flow, may be relatively difficult to interpret due to complicated wellbore dynamics and other effects. Thus, there exists a continuing need for better ways to interpret test results that are obtained from these tests.

SUMMARY

In some embodiments, an apparatus for performing a well test operation includes a closed chamber testing system having a downhole flow control device.

In some embodiments, a method of performing a well test operation includes performing a well test operation with a closed chamber testing system having a downhole flow control device and estimating the reservoir properties based on pressure and flow data measured during the well test operation.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It should be understood, however, that the appended drawings illustrate various embodiments and are therefore not to be considered limiting of its scope, and may admit to other equally effective embodiments.

While the foregoing is directed to embodiments described herein, other and further embodiments may be devised without departing from the basic scope thereof, and the scope thereof is determined by the claims that follow.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Figure 1:
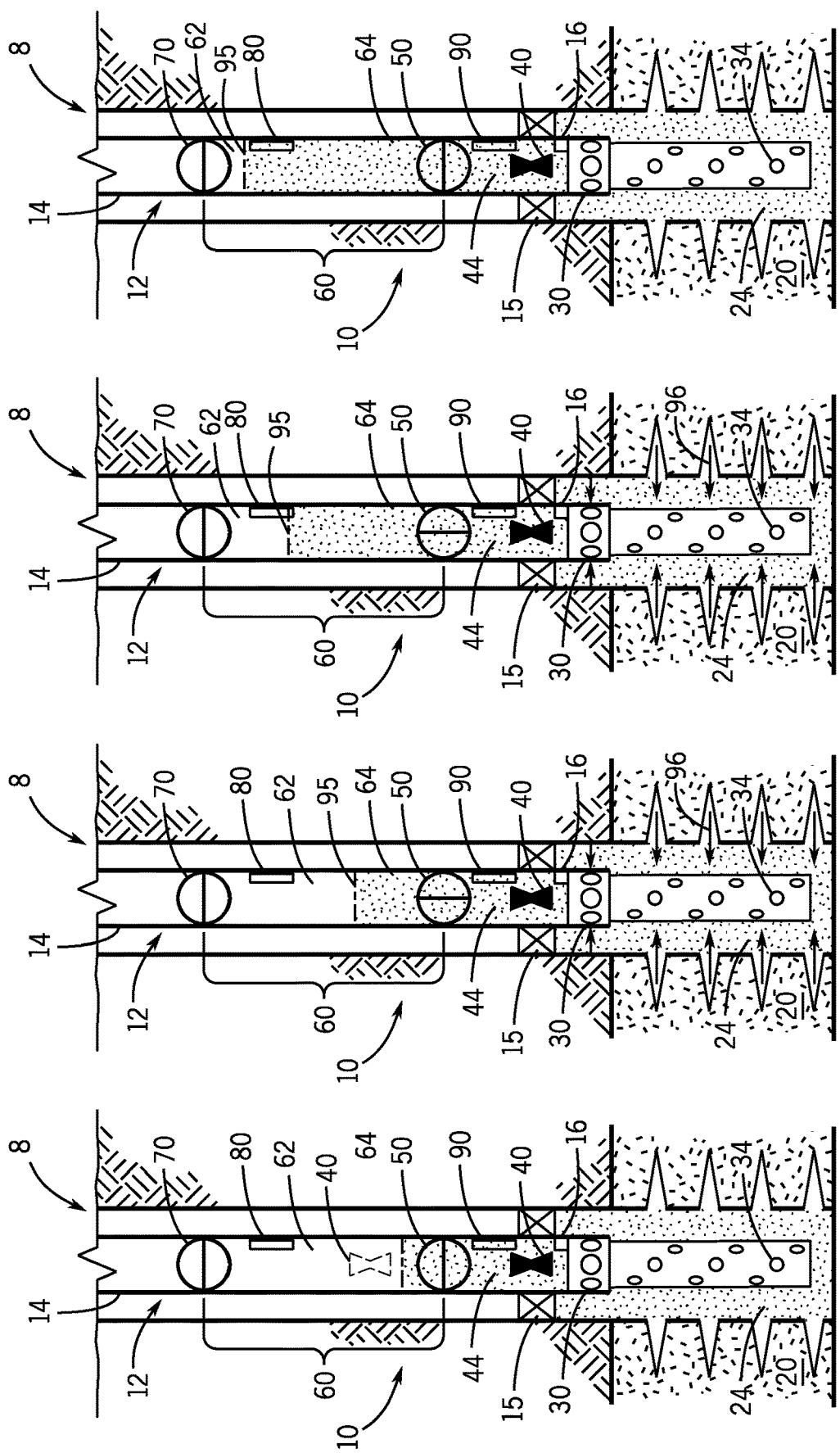
FIG. 1A schematically illustrates a closed chamber testing system before a bottom valve of the system is open and a closed chamber test begins, according to some embodiments of the disclosure.
FIG. 1B schematically illustrates a closed chamber testing system after a bottom valve of the system is open during a closed chamber test and well fluid flows into a surge chamber of the system, according to some embodiments of the disclosure.
FIG. 1C schematically illustrates a closed chamber testing system during a closed chamber test, according to some embodiments of the disclosure.
FIG. 1D schematically illustrates a closed chamber testing system after a bottom valve of the system is closed during a closed chamber test, according to some embodiments of the disclosure.

Embodiments generally described herein include a closed chamber testing system having a downhole flow control device. Referring to FIG. 1A, a closed chamber testing (CCT) system 10 in accordance with an embodiment obtains more accurate bottom hole pressure and flow measurements, thereby leading to improved estimation of formation property parameters of a well 8, which may be a subsea well or a non-subsea well.

The CCT system 10 may also offer an improvement over results obtained from wireline or other types of testing systems that have more limited radii of investigation. For example, wireline testing systems may have a radius of investigation of around 10 feet or less, sometimes referred to as a microscale test. Embodiments described herein, however, may have a radius of investigation of 100 feet or less, sometimes referred to as micro to macroscale. Some embodiments described herein may have a radius of investigation of 1,000 feet or less, sometimes referred to as macroscale.

In accordance with some embodiments, the CCT system 10 is part of a tubular string 14, such as, for example, a drill string, which extends inside a wellbore 12 of the well 8. The tubular string 14 may be a tubing string other than a drill string, in other embodiments. The wellbore 12 may be cased or uncased. The CCT system 10 includes a surge chamber 60, an upper valve 70, a bottom valve 50, and a flow control device 40. The upper valve 70 controls fluid communication between the surge chamber 60 and the central fluid passageway of the drill string 14 above the surge chamber 60. The bottom valve 50 controls fluid communication between the surge chamber 60 and the formation 20. When the bottom valve 50 is closed, the surge chamber 60 is closed, or isolated, from the well 8 and formation 20. The flow control device 40 regulates the fluid flow rate within the CCT system 10.

The flow control device 40 may be located above or below the lower isolation valve 50 within the well test system 10 that controls flow rate of fluid from the formation 20 and into a surge chamber 60. In some embodiments, the downhole flow control device 40 may be a variable or non-variable choke. Pressure measurement sensors 80, 90 may be placed above and below the choke to estimate the flow rate through the choke based upon the pressure drop across the choke. The pressure drop measurement may be obtained from either absolute pressure sensors placed above and below the choke, or from a differential pressure sensor which measures the pressure change across the choke.

In some embodiments, a separate flow measurement sensor may be placed either above or below the choke in the flow stream. A variable choke may be a choke that has the ability to change the choke diameter. In some embodiments, a variable choke may have a diameter that varies along a longitudinal axis travelling from a downstream end towards an upstream end of the choke device. A variable choke may incorporate an automatic control system such as a PID, PI, PD, or I feedback control loop, such that the choke is automatically adjusted to maintain a constant or nearly constant flow rate without any manual intervention from the surface and based upon either a direct measurement of flow rate or by inferring the flow rate from the pressure drop across the choke. Although the flow control device 40 may be located above or below the valve 50, the subsequent description refers to a flow control device 40 located below the valve 50.

FIG. 1A depicts the CCT system 10 in its initial state prior to the CCT (herein called the "testing operation"). In this initial state, both the upper 70 and bottom 50 valves are closed. The upper valve 70 remains closed during the testing operation. The CCT system 10 opens the bottom valve 50 to begin the testing operation and closes the bottom valve 50 at an optimal time to terminate the surge flow and isolate the surge chamber from the bottom hole wellbore. As depicted in FIG. 1A, in accordance with some embodiments of the disclosure, prior to the testing operation, the surge chamber 60 may include a liquid cushion layer 64 that partially fills the chamber 60 to leave an empty region 62 inside the chamber 60. It is noted that the region 62 may be filled with a gas (a gas at atmospheric pressure, for example) in the initial state of the CCT system 10 prior to the testing operation, in accordance with some embodiments of the disclosure. In such embodiments, the region 62 may also be referred to as the gas column 62.

The CCT system 10 measures at least one downhole parameter that is responsive to the flow of well fluid into the surge chamber 60 during the testing operation. One or more sensors may be installed inside the surge chamber 60 above the valve 50, above the surge chamber in the tubing 14, or below the valve 50. As a more specific example, the CCT system 10 may include an upper gauge, or sensor 80, that is located inside and near the top of the surge chamber 60 to measure a parameter inside the chamber 60. In accordance with some embodiments of the disclosure, the upper sensor 80 may be a pressure sensor to measure a chamber pressure. The sensor 80 is not limited to being a pressure sensor, however, as the sensor 80 may be one of a variety of other non-pressure sensors, such as temperature or other types of sensors.

The CCT system 10 may include at least one additional and/or different sensor than the upper sensor 80, in some embodiments of the disclosure. For example, in some embodiments of the disclosure, the CCT system 10 includes a lower gauge, or sensor 90, which is located below the bottom valve 50 (and outside of the surge chamber 60) to sense a parameter upstream of the bottom valve 50. More specifically, in accordance with some embodiments of the disclosure, the lower sensor 90 is located inside an interior space 44 of the string 14, a space that exists between the bottom valve 50 and radial ports 30 that communicate well fluid from the formation to the surge chamber 60 during the testing operation. The sensor 90 is not restricted to interior space 44, as it could be anywhere below valve 50 in the various embodiments of the disclosure. In some embodiments of the disclosure, the lower sensor 90 is a pressure sensor that provides an indication of a bottom hole pressure.

The upper 80 and/or lower 90 sensor may be used either individually or simultaneously for purposes of monitoring a dynamic fluid flow condition inside the wellbore. More specifically, in accordance with some embodiments of the disclosure, the CCT system 10 includes electronics that receive indications of measured parameter(s) from the upper 80 and/or lower 90 sensor. As a more specific example, for embodiments of the disclosure in which the upper 80 and lower 90 sensors are pressure sensors, the electronics 16 monitors at least one of the chamber pressure and the bottom hole pressure to recognize the optimal time to close the bottom valve 50. Thus, in accordance with the some embodiments of the disclosure, the electronics 16 may include control circuitry to actuate the bottom valve 50 to close the valve 50 at a time that is indicated by the bottom hole pressure or chamber pressure exhibiting a predetermined characteristic. In some embodiments of the disclosure, the electronics 16 may include telemetry circuitry for purposes of communicating indications of the chamber pressure and/or bottom hole pressure to the surface of the well so that a human operator or a computer may monitor the measured parameter(s) and communicate with the electronics 16 to close the bottom valve 50 at the appropriate time. The chamber pressure and/or bottom hole pressure may be logged by the CCT system 10 (via a signal that is provided by the sensor 80 and/or 90) during the CCT testing operation for purposes of allowing formation properties to be extracted from the CCT.

Among the other features of the CCT system 10, the CCT system 10 includes a packer 15 to form an annular seal between the exterior surface of the string 14 and the wellbore wall. When the packer 15 is set, a sealed testing region 24 is formed below the packer 15. When the bottom valve 50 opens to begin the testing operation, well fluid flows into the radial ports 30, through the downhole fluid flow control device 40, through the bottom valve 50, and into the chamber 60 as depicted in FIG. 1B. As also depicted in FIGS. 1A-1D, in accordance with some embodiments of the disclosure, the CCT system 10 may include a perforation gun 34 and another surge apparatus that is sealed off from the well during the initial deployment of the CCT system 10. Prior to the beginning of the testing operation, perforating charges may be fired or another technique may be employed to establish communication of fluid flow between formation 20 and a wellbore 12 for purposes of allowing fluid to flow into the gun 34 and surge apparatus. This inflow of fluid into the surge apparatus prior to the testing operation permits better perforation and clean up. The surge apparatus may be a waste chamber that, in general, may be opened at any time to collect debris, mud filtrate or non-formation fluids (as examples) to improve the quality of fluid that enters the surge chamber 60.

In other embodiments of the disclosure, the surge apparatus may include a chamber and a chamber communication device to control when fluid may enter the chamber. More specifically, the opening of fluid communication between the chamber of the surge apparatus and the region 24 may be timed to occur simultaneously with a local imbalance to create a rapid flow into the chamber. The local imbalance may be caused by the firing of one or more shaped charges of the perforation gun 34, as further described in U.S. Pat. No. 6,598,682 entitled, "RESERVOIR COMMUNICATION WITH A WELLBORE," which issued on Jul. 29, 2003.

FIGS. 1B and 1C depict the CCT system 10 during the CCT testing operation when the bottom valve 50 is open. As shown, well fluid flows through the radial ports 30, through the flow control device 40, through the bottom valve 50, and into the surge chamber 60, thereby resulting in a flow 96 from the formation. As the well fluid accumulates in the surge chamber 60, a column height 95 of the fluid rises inside the chamber 60. Measurements from one or both of the sensors 80 and 90 may be monitored during the testing operation. At an optimal time indicated by one or more downhole measurements, the bottom valve 50 closes to end the fluid flow into the surge chamber 60.

After the surge flow ends, the sensor 90 below the bottom valve 50 continues to log wellbore pressure until an equilibrium condition is reached between the formation and the wellbore, or, a sufficient measurement time is reached. The data measured by sensor 90 contains less noise because the choke 40 controls the fluid flow into the surge chamber 60, yielding a better estimation of formation properties.

Figure 3:
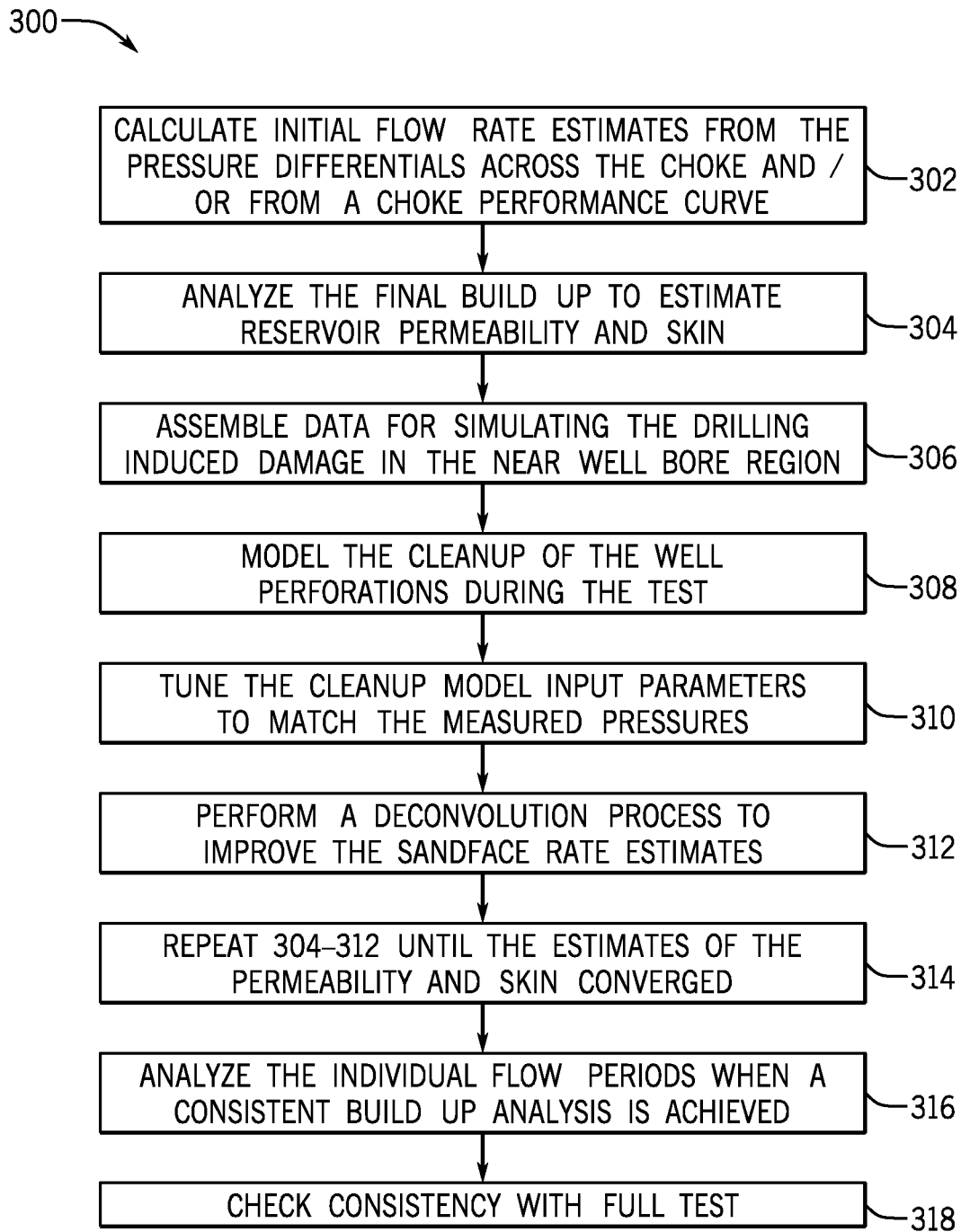
FIG. 3 is a flow diagram illustrating a method of interpreting well test data gathered while performing a closed chamber test while taking into account the multiple flow rate periods encountered during the testing operation, according to some embodiments of the disclosure.

The CCT system 10 may be used in connection with a method 300 that is generally depicted in FIG. 3, which is discussed in more detail below. After the surge chamber 60 is closed by closing valve 50 as shown in FIG. 1D, the bottom hole pressure continues to be logged.

Figure 4:
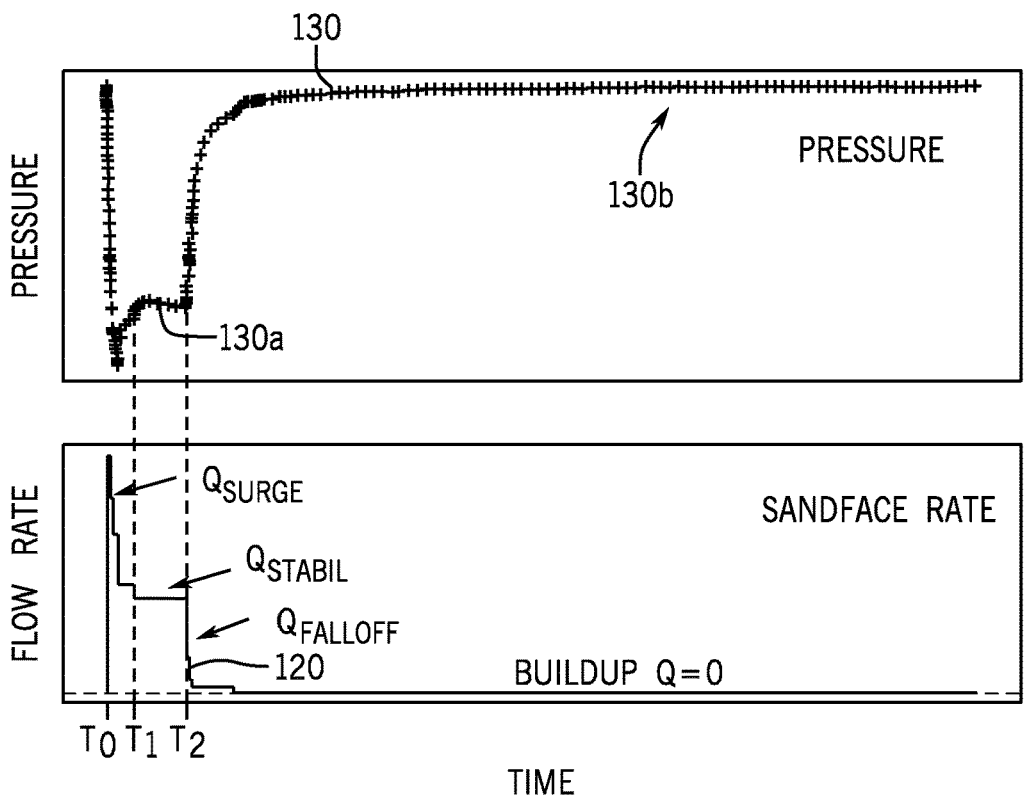
FIG. 4 is a graph illustrating measured pressures and flow rates of formation fluid during a closed chamber test, according to some embodiments of the disclosure.

In some embodiments of the disclosure, the upper 80 and lower 90 sensors may be pressure sensors to provide indications of the chamber pressure and bottom hole pressure, respectively. For these embodiments of the disclosure, FIG. 4 depicts waveforms 120 and 130 for the flow rate and bottom hole pressure, respectively, which generally illustrate, by example, the formation fluid flow rates into the bottom hole and the bottom hole pressure during a CCT testing operation. Referring to FIG. 4, soon after the bottom valve 50 is open at time $T_0$ to begin the testing operation, the bottom hole pressure waveform 130 decreases rapidly to a minimum pressure while the flow rate waveform 120 increases rapidly to a maximum flow rate. Because as formation fluid flows into the surge chamber 60 the liquid column inside the chamber 60 rises, the bottom hole pressure increases due to the increasing hydrostatic pressure at the location of the lower sensor 90. Therefore, as depicted in FIG. 4, the bottom hole pressure waveform 130 includes a segment 130a during which the bottom hole pressure rapidly decreases at time $T_0$, increases from approximately time $T_0$ to time $T_1$ due to the increasing hydrostatic pressure, and is relatively stable from time $T_1$ to time $T_2$.

In addition to the hydrostatic pressure effect, other factors also have influences on the bottom hole pressure, such as wellbore friction, inertial effects due to the acceleration of fluid, etc. One of the influences on the bottom hole pressure originates with the chamber pressure that is communicated to the bottom hole pressure through the liquid column inside the surge chamber 60. The chamber pressure gradually increases during the initial testing period from time $T_0$ to time $T_1$. The gradual increase in the chamber pressure during this period is due to liquid moving into the surge chamber 60, leading to the continuous shrinkage of the gas column 62 (see FIG. 1D). The magnitude of the chamber pressure increase is approximately proportional to the reduction of the gas column volume based on the equation of state for the gas. However, as the testing operation progresses, the gas column 62 shrinks to such an extent that no more appreciable volume reduction of the column 62 is available to accommodate the incoming formation fluid. The chamber pressure then experiences a dramatic growth (beginning at $T_2$) since formation pressure starts to be passed onto the chamber pressure via the liquid column.

The chamber pressure continuously changes during the testing operation because the gas chamber volume is constantly reduced, although with a much slower pace after the gas column can no longer be appreciably compressed. Thus, as shown in FIG. 4, after time $T_2$, as illustrated by the segment 130b, the bottom hole pressure waveform 130 first increases sharply and then increases at a much slower pace. Solution gas that was previously released from the liquid column may possibly re-dissolve back into the liquid, depending on the pressure difference between the chamber pressure and the bubble point of produced liquid hydrocarbon.

In accordance with some embodiments of the disclosure, the electronics 16 may measure the bottom hole pressure (via the lower sensor 90) to detect when the bottom hole pressure increases past a predetermined pressure threshold. Thus, the electronics 16 may, during the testing operation, continually monitor the bottom hole pressure and close the bottom valve 50 to shut-in, or isolate, the surge chamber 60 from the formation in response to the bottom hole pressure exceeding the predetermined pressure threshold. In some embodiments of the disclosure, the electronics 16 may monitor the pressure above and below the flow control device 40 to determine flow rate of formation fluid through the flow control device 40 and into the surge chamber 60.

Figure 2:
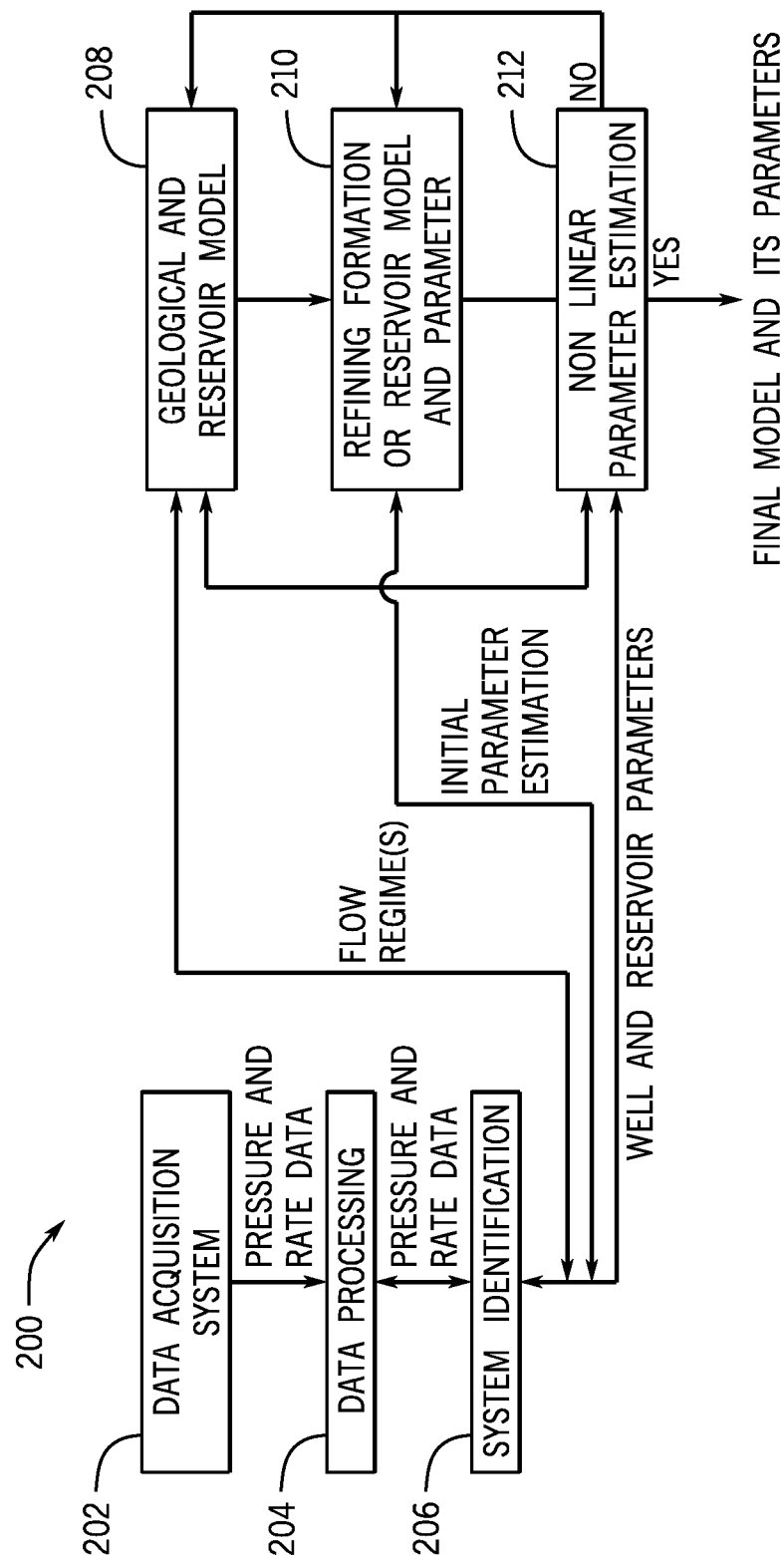
FIG. 2 is a flow diagram illustrating a method of interpreting well test data, according to some embodiments of the disclosure.

Further embodiments may include a telemetry system in the test string, such as that using electrical cable, fiber optic, wireless acoustic, or wireless electromagnetic telemetry principles, to deliver measured pressure, flow, or choke status information to the surface in real time, or near real time, or to control the choke or the lower valve directly from the surface. FIG. 2 illustrates a general overview of some methods according to embodiments described herein that may be used to gather, model, analyze, and interpret the data measured during a testing operation using a CCT system along with other types data to determine a final reservoir model and determine formation properties. More specifically, FIG. 2 is a diagram 200 that generally represents a procedure for collecting pressure and rate data from a well with a data acquisition system (box 202) and using it to extract the values of reservoir parameters of interest. Due to the non-linear nature of the physical processes (e.g., complex flow in the wellbore, complex rock-fluid interaction, and uncertainties about the reservoir geology), this can be an iterative procedure in which initial guesses at the parameter values are refined. Various data can be processed (box 204), such as pressure and rate data (which can be provided as log-log plots) so that the particular flow regime (linear, radial, bounded, wellbore storage dominated, etc.) can be identified (box 206). Once these are understood, parameters dominating the flow during each regime can be inferred and refined. Use can be made of regression software to alter the parameter values to best fit the measured data (boxes 208, 210,212).

Methods to analyze and improve the estimation of the reservoir properties from a CCT, as described herein, may generally take into account three rate periods, as shown in FIG. 4. The rate periods may be used to classify the types of flow in order to apply the appropriate analysis model for determining formation properties. Some of the rate periods that may result from the inclusion of a downhole choke in the test string include: 1) formation fluid surge ($Q_{surge}$ in FIG. 4) into the well and closed chamber test system immediately following either firing the perforating guns, or if the well is already perforated, by opening the bottom valve, 2) stabilized flow ($Q_{stabil}$) through the downhole control device, and 3) a period of reducing flow ($Q_{falloff}$) as the back pressure in the chamber reduces the reservoir inflow, or due to a controlled increase in the restriction of a variable choke.

Following these three non-zero flow rate periods, the bottom valve 50 is closed which results in zero flow through the choke 40 while the pressure below the bottom valve 50 continues to build and approaches or attains the original reservoir pressure. At the end of the third flow rate period, the bottom valve 50 can be closed by traditional means by manipulating applied hydraulic pressure in the annulus, by an automated downhole control algorithm, or by means of a telemetry command sent from the surface. In some embodiments, the stabilized flow period may not be present depending upon the well and reservoir properties. Regardless of the number of rate periods observed during a test operation, the method illustrated in FIG. 3 is applied to the pressure and flow rate data gathered during the test operation to determine formation properties.

In some embodiments, an iterative calculation of the flow rate in periods 1) and 3) may be performed based upon initial estimates of the reservoir model parameters and from pressure measurement data taken during the stabilized flow period 2). Generally, the first flow period may be deemed a well "clean up" period in which reservoir fluid flushes out the debris, etc. that remains in the well following drilling. The equations of state used to more accurately model the fluid flow during the clean up period are generally complex. The second flow period may be deemed a stabilization flow enabling use of more simple equations to accurately model the system. The third flow period may be deemed a boundary condition period as the pressure in the surge chamber 60 builds, compressing the gas column 62 above the fluid, and also using complex equations to model, but generally different equations and assumptions from those used to model flow during the first flow period. Incorporating the flow control device 40 in the CCT system 10 and determining the flow rate through the flow control device 40 enables operators to more accurately determine which flow period the measured data comes from and thereby apply the appropriate equations to data gathered from any of the three possible flow periods.

Additionally, during the drilling there is invasion of the mud (internal and external mud cake) that prevents flow back of the formation fluid into the well. During the perforation and testing operation, that material and other debris is flushed out of the reservoir. This "clean up" process may be modeled with the flow rate data gathered during the testing operation. Thus, determining the flow rates during the testing operation and modeling the clean up of a well during surge and stabilization flow periods may provide the ability to estimate the optimum time to open sample bottles and sample "clean" oil, free of any downhole debris remaining in the well after drilling. Some of the aspects are discussed in more detail below.

Figure 5:
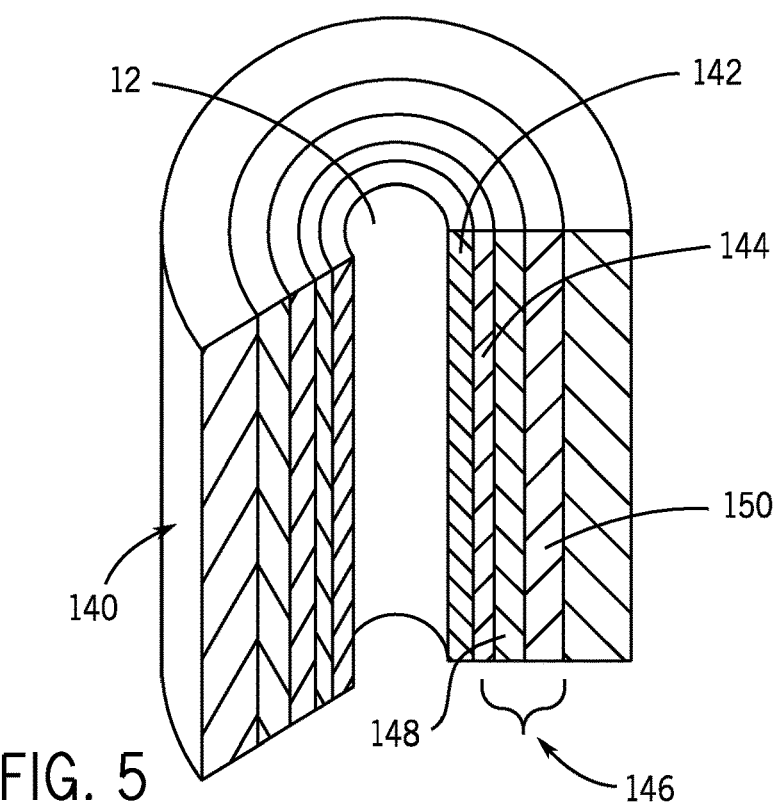
FIG. 5 schematically illustrates formation damage that may occur during drilling and methods of cleaning up formation damage during a closed chamber test, according to some embodiments of the disclosure.

FIG. 3 illustrates a method 300 of performing an iterative calculation in order to estimate the reservoir properties while taking into account the multiple flow rate periods encountered during the testing operation previously described. The initial rate estimates are calculated from the pressure differentials across the downhole flow control device and/or from a flow control device performance curve, as shown in box 302. The final build up is analyzed to estimate the reservoir permeability and skin, as shown in box 304. The data for simulating the drilling induced damage in the near well bore region is assembled, as shown in box 306. FIG. 5 depicts a near well bore region by way of example. As shown in this figure, the near well bore region includes a wellbore 12 in a reservoir 140. Drilling mud particulates are deposited on and in the wall of the wellbore 12 to form an external mud cake 142 and an internal mud cake 144. Drilling mud filtrate is also pushed into the reservoir 140, forming an invaded zone 146. As will be appreciated, the invaded zone 146 can include a flushed zone 148 and a transition zone 150. Various parameters can be used to model the reservoir formation properties and the fluid flow during clean up of a well. The data that may be assembled to determine drilling induced damage may include but are not limited to, for example, drilling logs, mud logs, mud properties such as solids and salinity, reservoir rock properties including permeability and skin, reservoir and well bore fluid properties, external and internal mud cake parameters, and well design.

Modeling of the cleanup of the well perforations during the test may be performed, as shown in box 308. The cleanup model input parameters are tuned to match the measured pressures, as shown in box 310. The cleanup model may be tuned, for example, by adjusting any of the following parameters alone or in combination: reservoir/rock properties, reservoir and well bore fluid properties, mud properties including solids, salinity, etc., and external and internal mud cake parameters.

A deconvolution process is performed to improve the sandface rate estimates, as shown in box 312. The deconvolution process may use the measured pressures and current estimates of reservoir permeability. Boxes 304 through 312 are repeated as needed until the estimates of permeability and skin have converged, as shown in box 314. When a consistent build up analysis is achieved, the individual flow periods are analyzed, as shown in box 316. The results are then checked for consistency with a full test, as shown in box 318.

The processes illustrated in FIG. 2 may be applied during the design or the execution of the testing operation with the CCT system 10. For example, during the design of the testing operation, the choice of sensor resolution will determine the maximum length of the final buildup. Changes in pressure below the sensor resolution will not be visible to the test operation should not proceed beyond this time. Maximizing the length of the buildup produces a better quality pressure response, i.e. the pressure response measured contains less noise. The analysis algorithms allow estimation of maximum build up time for a given sensor resolution and reservoir properties. Additionally, the final build up may be modeled and analyzed to estimate the reservoir permeability and skin prior to performing the actual test. During the test design, software may predict the pressure response on a model of the reservoir, which data can then be used in a pre-test analysis to verify that the sensor resolution is sufficient for the designed test.

During execution of the testing operation, the evolution of the sandface skin may be used to indicate the earliest time that clean samples may expect to be taken. For example, if an exponential falloff of skin is anticipated, this curve can be fitted parametrically with the skin values derived from performing boxes 302 through 312 to determine the time when the skin falls to an acceptable level or stabilizes.

Real time monitoring of the testing operation enables running the testing operation and reservoir estimation processes in real time. Software connects to the real time system and displays the real time data alongside the designed tests. The real time system may propose a previously designed test that closely matches the actual test data or an operator may manually select a previously designed test. The operator decides if it is appropriate to alter the start of the final buildup time to match the buildup time used in the chosen test design.

In some embodiments, an inverse modeling of the reservoir parameters using a grid based parameter estimation inside a full earth model may be performed. Additionally, pressure transient analysis or PTA may be performed but with embedded pressure-rate deconvolution. The method may also include monitoring and modeling of clean-up of the near well region. In situations where the test is being performed directly after perforating, the skin zone within and around the near wellbore region will change with time.

Modeling software has been created to couple the reservoir and wellbore flow, which software can be used in the Inverse Modeling procedure to estimate the final skin after clean up. The method may also include deconvolution of the pressure-rate response prior to analysis. This replaces the pressure response due to the observed multiple rates with the response due to a single effective rate.

Intelligent sensors and automated control software inside the downhole flow control device automatically close the isolation valve as the surge chamber begins to fill with reservoir fluid. Commands may be transmitted electronically in real time to control the opening and closing of the flow control device and/or the isolation valve. Additionally, pressure measurements may be transmitted in real time back to the surface for immediate analysis.

Incorporating a downhole flow control device within a closed chamber test permits measurement of downhole flow rates during an impulse test and estimation of flow rates from continuously monitored pressure measurements, decreases the amplitude of the uncontrolled surge of reservoir fluid into the wellbore at the start of the test compared to conventional CCTs while increasing the length of formation fluid flow and pressure build time, enabling more formation fluid data to be collected. Increasing the length of the fluid flow and the buildup time also increases the radius of investigation of the determined reservoir properties which enhances the value of a CCT.

Embodiments described herein may also provide a sophisticated analysis procedure that accounts for the wellbore damage induced by the drilling that will affect the flow profiled during the testing operation. The damage is estimated from data collected during the drilling operation. The state of the near well bore is then used as the initial conditions for modeling the subsequent cleanup of the well and perforations during the analysis of the measured pressure data.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A well-testing apparatus comprising:
a tubular member having a surge chamber;
a valve disposed in the tubular member to control fluid flow from a well into the surge chamber;
a flow control device disposed in the tubular member, wherein the flow control device includes a choke;
a pressure gauge disposed in the tubular member between the valve and the flow control device; and
a data acquisition system configured to calculate flow rates of the fluid from the well into the surge chamber during periods of surge flow, stabilized flow, and reducing flow into the surge chamber, such calculation including performing iterative calculations of flow rates of the fluid from the well into the surge chamber for the period of surge flow and for the period of reducing flow based on pressure measurement data acquired during the period of stabilized flow of the fluid from the well into the surge chamber.

2. The well-testing apparatus of claim 1, wherein the flow control device is positioned within the surge chamber.

3. The well-testing apparatus of claim 1, wherein the flow control device is positioned outside the surge chamber such that, during fluid flow from the well into the surge chamber, the fluid flows through the flow control device and then through the valve into the surge chamber.

4. The system of claim 1, comprising an additional valve at an opposite end of the surge chamber from the valve.

5. The well-testing apparatus of claim 1, wherein the choke includes a variable choke configured to be automatically adjusted to maintain a flow rate of fluid from the well into the surge chamber without manual intervention from the surface.

6. The well-testing apparatus of claim 1, wherein the pressure gauge is a first pressure gauge, and further comprising a second pressure gauge disposed in the surge chamber.

7. The well-testing apparatus of claim 6, wherein the flow control device is positioned between the first and second pressure gauges.

8. The system of claim 6, comprising electronics operable to monitor pressure sensed by at least one of the first and second pressure gauges and to actuate the valve in response to the monitored pressure.

9. A method comprising:
initiating a closed chamber test within a well using a downhole testing apparatus;
routing formation fluid into a surge chamber of the downhole testing apparatus, wherein routing the formation fluid into the surge chamber includes routing the formation fluid through a choke of the downhole testing apparatus; and
measuring a flow rate of the formation fluid routed into the surge chamber, wherein measuring the flow rate of the formation fluid routed into the surge chamber includes calculating flow rates of the formation fluid routed into the surge chamber during periods of surge flow, stabilized flow, and reducing flow into the surge chamber, and calculating flow rates of the formation fluid routed into the surge chamber during the periods of surge flow and reducing flow includes performing iterative calculations of flow rates of the formation fluid routed into the surge chamber for the period of surge flow and for the period of reducing flow based on pressure measurement data acquired during the period of stabilized flow of the formation fluid into the surge chamber.

10. The method of claim 9, comprising controlling flow of the formation fluid into the surge chamber to lengthen a testing time of the closed chamber test and enhance a radius of investigation of the closed chamber test.

11. The method of claim 9, wherein initiating the closed chamber test includes opening an isolation valve to allow the formation fluid to enter the surge chamber.

12. The method of claim 9, wherein measuring the flow rate of the formation fluid through the choke includes using a pair of pressure sensors to measure a pressure drop across the choke.

13. The method of claim 9, comprising estimating reservoir properties based on pressure data and the measured flow rate of the formation fluid.

14. The method of claim 9, comprising estimating reservoir properties based on the calculated flow rates.

15. The method of claim 9, wherein calculating flow rates of the formation fluid during periods of surge flow, stabilized flow, and reducing flow includes:
calculating initial estimates of the flow rates for the periods;
estimating reservoir permeability and skin;
modeling cleanup of well perforations; and
improving the accuracy of the initial estimates of the flow rates through deconvolution.

16. The method of claim 9, comprising controlling the flow rate of the formation fluid through the choke by adjusting the choke.

17. The method of claim 16, comprising automatically adjusting the choke to maintain the flow rate without manual intervention from the surface.

18. A well-testing apparatus comprising:
a tubular member having a surge chamber;
a valve disposed in the tubular member to control fluid flow from a well into the surge chamber;
a flow control device disposed in the tubular member; and
a pressure measurement sensor placed above the flow control device and another pressure measurement sensor placed below the flow control device, wherein the flow control device includes a feedback control loop to control flow through the flow control device based on pressure drop through the flow control device.

19. The well-testing apparatus of claim 18, wherein the flow control device comprises a variable choke.

20. The well-testing apparatus of claim 18, wherein the flow control device is operable to maintain nearly constant flow rate without manual intervention.

* * * * *